May 10, 1966  E. L. BOATRIGHT  3,250,524

STABILIZER

Filed Oct. 21, 1963  2 Sheets-Sheet 1

INVENTOR.
EARLISH L. BOATRIGHT

BY *Newton, Hopkins & Jones*

ATTORNEYS

May 10, 1966  E. L. BOATRIGHT  3,250,524
STABILIZER
Filed Oct. 21, 1963  2 Sheets-Sheet 2

INVENTOR.
EARLISH L. BOATRIGHT
BY
Newton, Hopkins & Jones
ATTORNEYS

United States Patent Office 3,250,524
Patented May 10, 1966

3,250,524
STABILIZER
Earlish L. Boatright, Rte. 1, Mershon, Ga.
Filed Oct. 21, 1963, Ser. No. 317,520
3 Claims. (Cl. 267—1)

This invention relates to linkages, and is more particularly concerned with a resilient link for use as a stabilizing link or the like.

When a vehicle tows another vehicle, some stabilizing means is generally used to prevent undue sway of the trailing vehicle; but, some resilience is required so that the trailing vehicle can move sideways relative to the tractive vehicle when the trailing vehicle engages some obstruction.

One common application of stabilizing links is on farm implements that are towed by a tractor. For such use, the implement must be capable of some sway in travelling over rough terrain, and must be able to move aside when the implement engages a rock, tree stump or the like. When the implement moves with respect to the tractor, it must be realigned with the tractor; and, as little back and forth sway as possible is desirable.

Numerous stabilizing means have been previously devised. The prior art stabilizers have included various elaborate linkage systems, frequently with a plurality of springs. Such systems are expensive to make, and quite difficult to design for a completely balanced system.

The stabilizing link of the present invention overcomes the difficulties encountered in the prior art by providing a stabilizing link which has a single spring. The spring is mounted in a mechanical arrangement whereby the link can be either expanded or compressed, and the spring will be compressed in both instances. This allows ease in balancing two or more of the stabilizers to be used on one vehicle since the same spring is used whether the link is expanded or contracted, and that spring is always compressed.

In general terms, the device of the present invention comprises a bar having a sleeve fixed thereto. A shaft is slidable in the sleeve. A spring is mounted from the sleeve in such a manner that, whether the shaft is moved in one axial direction or the other, the spring is compressed.

This arrangement allows a single spring to be used on each stabilizing link so that the forces in both directions are inherently balanced. There is a minimum number of parts; and, the link is quite rigid and lends itself to be designed for very large forces.

The system used with the stabilizing link of the present system is very stable; hence, when the trailing vehicle is forced to one side, it is quickly re-aligned with the tractive vehicle with a minimum number of oscillations.

These and other features and the advantages of the present invention will become apparent from the following specification when taken in conjunction with the accompanying drawings in which.

Figure 1:
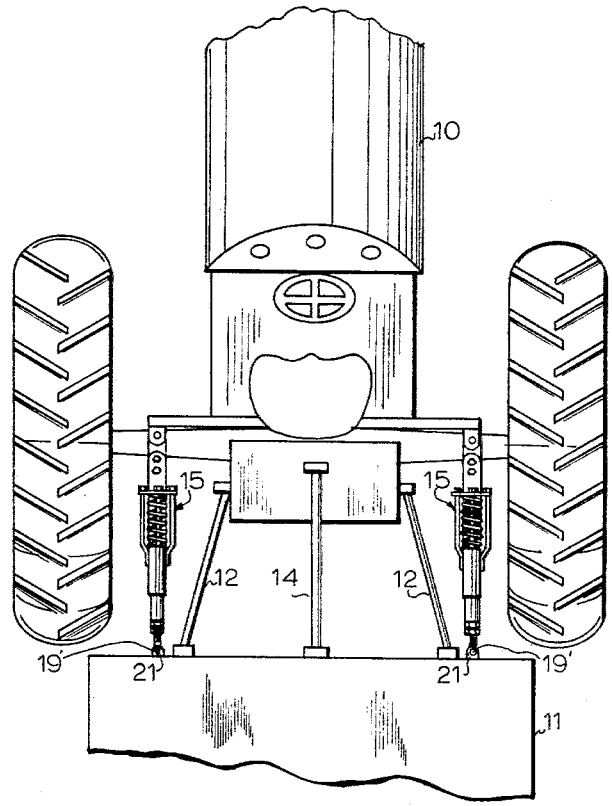
FIG. 1 is a top plan view of a conventional tractor and trailer having a pair of stabilizing links therebetween.

Referring now more particularly to the drawings and to that embodiment here chosen by way of illustration, FIG. 1 shows a tractor 10 having a trailer 11 attached thereto by a conventional 3-point hitch having side arms 12 and a top connector 14. The stabilizing links 15 are secured between the tractor 10 and the trailer 11 outwardly of the hitch arms 12.

A three-point hitch allows a considerable amount of side to side sway; and, the sway is determined entirely by forces on the trailer, i.e., the three-point hitch has no inherent means to control the sway.

Two of the stabilizing links are attached between the tractor 10 and the trailer 11. The attachment of the links at the tractor 10 is shown in more detail in FIG. 2 and includes a clevis 16 which is rigidly attached to the tractor. A tongue 18, which is on one end of each of the links 15 is received in the clevis 16 and held loosely by a pin 19 passing through a hole 20 in the tongue 18. The pin 19 and hole 20 are of such sizes that the tongue 18 can move in any angular direction relative to the clevis 16.

The opposite end of the link 15 is pivotally connected to the trailer 11 as at 21 by a pin 19', the arrangement being similar to that illustrated for the tongue 18.

Both of the links 15 are identical; therefore, only one link 15 will be described in detail.

The link itself is best shown in FIGS 3–6 and has a round shaft 25 which is tubular, and has a plug 26 fixed in one end of the shaft 25. The opposite, outer, end of the shaft 25 has an internally threaded portion 28 in axial alignment therewith. A screw 29 is threadedly engaged with the threaded portion 28, and will fit inside the tubular shaft 25. Thus, the effective length of the link 15 can be varied by rotating the screw 29 to cause it to move axially of the shaft 25. The outer end of the screw 29 carries a flange 30 which has a hole therein to receive the pivot pin 19' to connect the flange 30 to the trailer 11.

Adjacent the threaded portion 28 and surrounding the screw 29, there is a lock nut 31 which can be tightened to secure the screw 29 in the desired position.

A sleeve 32 is slidably received on the shaft 25. The sleeve 32 is of such size that it will slide easily axially of the shaft 25, but can move very little radially. The length of the sleeve 32 is such that it can move to some extent axially before striking the portion 28.

Extending forwardly of the sleeve 32 is a bar 34. The bar 34 is fixed, as by welding or the like, to the bottom of the sleeve 32, parallel to the axis of the sleeve 32. The bar 34 extends past the sleeve 32 and carries the tongue 18, which is bolted on the bar 34 by bolts 35.

To the sides of the sleeve 32 there are attached diametrically opposed side rods 36. Each of the side rods 36 has a portion of one end lying against the sleeve 32 and fixed thereto, as by welding. There is an offset 38 in the side rods which spaces the free ends 39 of the side rods 36 radially outwardly of the sleeve 32, though parallel to the axis of the sleeve 32.

Figure 3:
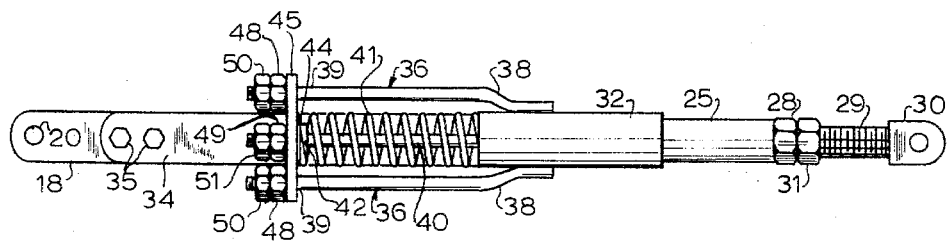
FIG. 3 is an enlarged top plan view of one of the links shown in FIG. 1.
Figure 4:
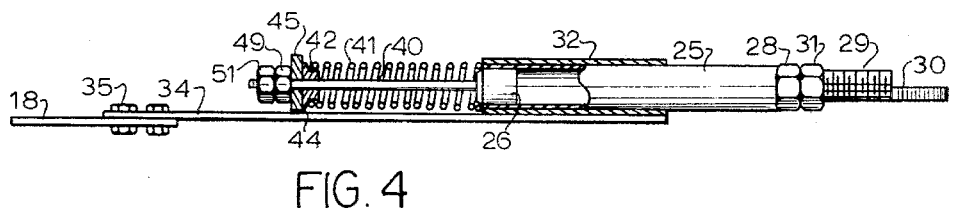
FIG. 4 is a side elevational view, partially in cross-section, of the link shown in FIG. 3.
Figure 5:
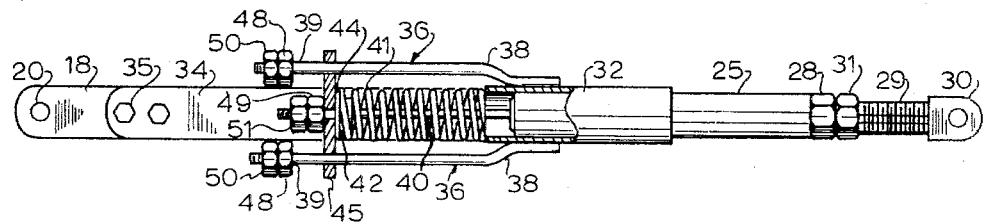
FIG. 5 is a top plan view, partially in cross-section, showing the link expanded.
Figure 6:
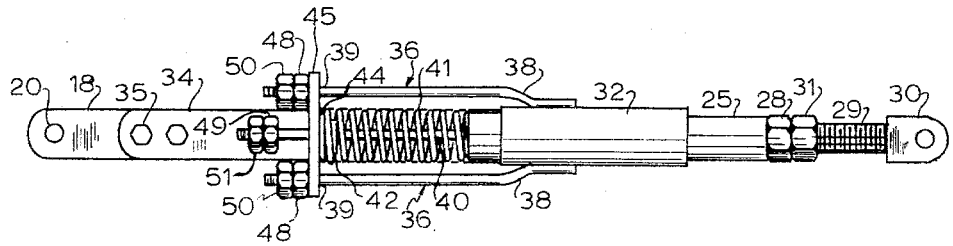
FIG. 6 is a view similar to FIG. 5, but showing the link compressed.

The shaft 25 carries a center rod 40 which is secured to the plug 26 and is coincident with the centerline of the shaft 25. As is best shown in FIG. 3 of the drawings, the center rod 40 terminates at the same transverse line as the two side rods 36, when the link is in its relaxed state; and, all three rods are parallel.

Between the side rods 36 and surrounding the center rod 40 is a coiled compression spring 41. One end of the spring 41, i.e., the end adjacent the sleeve 32, has an outside diameter large enough that it will seat on the end of the sleeve 32, and an inside diameter small enough that it will seat on the end of the shaft 25. The plug 26 has a beveled edge to maintain proper centering of the spring about the rod 40.

The opposite end of the spring 41, i.e., the end of the spring farthest from the sleeve 32, is provided with a bushing 42. The bushing 42 has a central hole to receive the center rod 40, and a peripheral shoulder 44 on which the spring 41 seats. A plate 45 abuts the bushing 42 to limit the outward movement of the bushing 42 relative to the center rod 40. The plate 45 has three holes therein to receive the three rods (two side rods 36 and one center rod 40); and, nuts 48 and 49 are threadedly attached to the rods 36 and 40 respectively to prevent the plate's slipping off the rods. Lock nuts 50 and 51 are on the outermost ends of the rods 36 and 40 respectively to prevent inadvertent loosening of the nuts 48 and 49.

From the foregoing, operation of the device should be obvious. When the link 15 is extended (FIG. 5), the shaft 25 is pulled away from the tongue 18. Since the sleeve 32 is rigidly attached to the bar 34, the sleeve 32 will remain stationary relative to the bar 34, and the shaft 25 will slide axially through the sleeve 32.

The spring 41, as stated above, has a sufficiently large outside diameter to seat on the end of sleeve 32. Thus, as the shaft 25 moves through the sleeve 32 away from the tongue 18, and the plate 45 is moved toward the sleeve 32 by the center rod 40, the spring 41 is held between the plate 45 and the sleeve 32; hence, the spring 41 is compressed.

When the link is contracted, or more precisely, compressed (FIG. 6), the shaft 25 is moved through the sleeve 32 toward the tongue 18.

The plate 45 is held against the nuts 48 on side rods 36, which prevents movement of the spring 41 as a whole. The spring 41, as previously stated, has a sufficiently small inside diameter to seat on the end of the shaft 25; therefore, as the shaft 25 moves through the sleeve 32, the end of the spring 41 seated thereon will be moved accordingly. The plate 45 is stationary relative to the sleeve 32; the spring 41 is seated against the plate 45; the end of the shaft 25 approaches the plate 45; and the spring 41 is seated on the end of the shaft 25; hence, the spring 41 is compressed.

In use, two of the stabilizing links may be used, as shown in FIG. 1 of the drawings. Both links will be alike, and the links would be easy to balance since the two springs would be designed alike, and would be subjected to the same kinds of forces. Since the springs are always compressed, there is no danger of the springs being stressed beyond their elastic limit. The springs can be designed to reach their solid length without being stressed beyond their elastic limit; and, at solid length, the springs can withstand considerable force.

Figure 2:
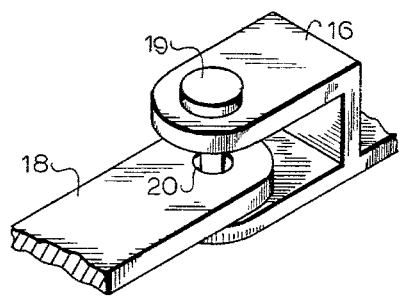
FIG. 2 is an enlarged perspective view of the means for hitching the link to the tractor.

The connection between the tractor and trailer as illustrated in FIG. 2 is such that, with use, the hole 20 in the tongue 18 and the hole in the flange 30 will become enlarged. When the tongue 18 is worn beyond use, the tongue may be unbolted from the bar 34, and a new tongue can be secured in its place. When the flange 30 becomes worn beyond use, the screw 29 can be removed and replaced. Thus, the parts that are likely to be worn are easily replaceable without replacing the entire link 15.

It will be understood that the device here presented is by way of illustration only, and is meant to be in no way restrictive; therefore numerous changes and modifications may be made and the full use of equivalents resorted to without departing from the spirit or scope of the invention as outlined in the appended claims.

I claim:

1. A stabilizing link for resiliently connecting two points including a shaft connected to one of said points, a sleeve surrounding said shaft and axially slidable thereon, a first rod carried by said sleeve, a second rod carried by said shaft extending axially therefrom, said first rod being parallel to said second rod, a plate carried by and slidable on both said rods, stop means on both said rods to limit the movement of said plate in one direction, a spring surrounding said second rod and acting against said plate, the adjacent end of said spring being sufficiently large to engage an end of said sleeve and sufficiently small to engage an end of said shaft, and a bar carried by said sleeve parallel to the axis of said sleeve, said bar being connected to the other of said points.

2. A stabilizing link for resiliently connecting two points including a shaft connected to one of said points, a sleeve surrounding said shaft and axially slidable thereon, a plurality of rods carried by said sleeve extending beyond said sleeve and parallel to the axis thereof, a center rod carried by said shaft extending toward the other of said points axially of said shaft so as to be parallel to said plurality of rods, a plate carried by said plurality of rods and said center rod, said plate being slidable thereon, stop means on said rods to limit the movement of said plate toward said other of said points, a coiled compression spring surrounding said center rod between said shaft and said plate, one end of said spring acting against said plate, the opposite end of said spring having an outside diameter sufficiently large to engage an end of said sleeve and an inside diameter sufficiently small to engage an end of said shaft, and a bar attached to said sleeve and extending parallel to the axis of said shaft, said bar being connected to said other of said points.

3. A stabilizing link for resiliently connecting two points including an elongate member connected to one of said points and having a channel therethrough, a plug in one end of said channel, an internally threaded portion at the opposite end of said channel, a screw threadedly engaging said threaded portion and disposed partially inside said channel, a sleeve surrounding said elongate member and axially slidable on said elongate member, a pair of side rods attached to said sleeve and substantially diametrically opposed, said side rods being attached toward one end of said sleeve and extending beyond said sleeve parallel to the axis thereof, a center rod fixed to said plug, said center rod projecting along the axis of said elongate member, a coiled compression spring surrounding said center rod, one end of said spring having an outside diameter sufficiently large to engage one end of said sleeve and an inside diameter sufficiently small to engage one end of said shaft, a plate slidably carried on said side rods and said center rod, said spring acting against said plate, stop means on each of said rods to restrict the movement of said plate toward the other of said points, a bar carried by said sleeve parallel to the axis thereof and extending toward said other of said points, and a tongue removably attached to the end of said bar toward said other of said points, said tongue being connected to said other of said points.

References Cited by the Examiner

UNITED STATES PATENTS

| 397,882 | 2/1889 | Westaway | 267—71 X |
| 1,654,939 | 1/1928 | Loebs | 280—486 X |
| 1,915,198 | 6/1933 | Nyborg. | |
| 2,023,527 | 12/1935 | Johansen | 267—34 X |
| 3,056,458 | 10/1962 | Gray | 172—450 |

FOREIGN PATENTS

| 54,178 | 3/1923 | Sweden. |
| 248,317 | 5/1926 | Italy. |

ARTHUR L. LA POINT, *Primary Examiner.*